United States Patent Office.

LOUIS BAUHOEFER, OF PHILADELPHIA, PENNSYLVANIA.

IMPROVED METHOD OF TREATING CORK FOR MATTRESSES, &c.

Specification forming part of Letters Patent No. 59,342, dated November 6, 1866.

*To all whom it may concern:*

Be it known that I, LOUIS BAUHOEFER, of Philadelphia, Pennsylvania, have invented an Improved Mode of Treating Cork for Use in Mattresses, Life-Preservers, &c.; and I do hereby declare the following to be a full, clear, and exact description of the same.

My invention consists in treating particles of cork to be used as a stuffing material for mattresses, &c., as fully described hereinafter, so that the cork shall be softer, more spongy, and more elastic, as well as less liable to become moldy and foul or to become infected with insects, than the ordinary cork not so prepared.

In order to enable others to practice my invention, I will now proceed to describe the manner of carrying the same into effect.

The cork to be used as a stuffing or filling material is first broken, ground, cut into shavings, or otherwise divided, and is then placed in a revolving perforated casing or box with wire-cloth sides, which is so arranged in respect to a fire-place that the products of combustion arising from the burning fuel shall pass through the casing and be brought into intimate contact with every particle of the cork therein, the heat being so regulated that portions of the cork shall be slightly charred.

When the cork has been thoroughly fumigated, myrrh, bay-leaves, or other aromatic substance is thrown onto the fire, so that the vapor or smoke from the heated material shall be brought into contact with the cork and scent the same.

I have found that cork treated as above described is much less liable to absorb moisture and become moldy or foul than the ordinary cork not so prepared, and that by scenting the same its disagreeable odor is destroyed, and the liability of the mattress to become infested with insects is effectually prevented. By charring or burning the cork, also, it is rendered much more spongy and elastic, so much so that for ordinary purposes I find it better to only char a portion of the cork, as if the whole mass were thus treated the mattress stuffed with the same would be too yielding.

Without confining myself to the use of any particular materials for fumigating the cork, or to the within-described mode of carrying out my process,

I claim as my invention and desire to secure by Letters Patent—

1. Subjecting particles of cork to be used as a stuffing for mattresses, &c., to the action of the products of combustion obtained by burning wood, tan, or other suitable material, substantially as and for the purpose described.

2. Charring or partially burning the particles of cork to be used as a filling material, for the purpose set forth.

3. Subjecting the cork to the action of the fumes or vapors arising from heated aromatic substances, as and for the purpose specified.

In testimony whereof I have signed my name to this specification in the presence of two subscribing witnesses.

LOUIS BAUHOEFER.

Witnesses:
EDWARD WILLIAMS,
HENRY G. HAUER.